United States Patent Office 3,679,624
Patented July 25, 1972

3,679,624
POLYAMIDES
Owen Burchell Edgar, Manchester, William Hughes, Norton, Derek Robert Lawrance, Abergavenny, Gerald Lederer, Stockton-on-Tees, and Colin Foster Ritchie, Manchester, England, assignors to Imperial Chemical Industries Limited, London, and British Titan Products Company Limited, Billingham, England
No Drawing. Continuation of application Ser. No. 684,542, Nov. 20, 1967. This application Sept. 25, 1970, Ser. No. 75,778
Claims priority, application Great Britain, Nov. 25, 1966, 52,828/66
Int. Cl. C08g *45/56, 51/04*
U.S. Cl. 260—37 N                    9 Claims

ABSTRACT OF THE DISCLOSURE

Polyamide compositions comprising a synthetic linear fibre-forming polyamide, a delustering agent (especially titanium dioxide), a manganese compound and an antimony compound, and optionally a copper compound and a halide, or a phenol and hypophosphorous acid or a salt thereof; processes for their manufacture; and titanium dioxide pigments suitable for use in their manufacture containing chemically combined antimony and having a coating containing chemically combined manganese.

---

This a continuation of prior U.S. application of Edgar et al., Ser. No. 684,542, now abandoned.

This invention relates to synthetic linear fibre-forming polyamides and more particularly to delustered synthetic linear fibre-forming polyamide compositions stabilised against the destructive influence of exposure to light.

By synthetic linear fibre-forming polyamides we mean in particular those known generically as nylons and which are obtained by polycondensation of aminocarboxylic acids (or their derived lactams) or of diamines with dicarboxylic acids. Such polyamides are well known to the art, and particularly familiar examples are polycaprolactam (nylon 6) and polyhexamethylene adipamide (nylon 66). When such polyamides have molecular weights in the fibre-forming range they are readily converted into synthetic fibres by melt spinning.

For many purposes fibres spun from such polyamides are required to be delustered, that is rendered dull and matt, and this is effected by incorporating in the polyamides certain pigments, called delustering agents, of which titanium dioxide is a widely used example. Unfortunately such delustering agents have an adverse effect on the stability of the polyamide fibres to light. Although all polyamide fibres are affected by exposure to light, suffering a loss in strength on prolonged exposure, this loss in strength is greatly accelerated by the presence of delustering agents. However, it has long been known that this accelerated loss in strength can be reduced or eliminated if there is present in the polyamide composition certain compounds of manganese. The use of manganese compounds for this purpose, however, has certain disadvantages. Thus it is customary to heat set the polyamide fibres at some stage between their formation and their ultimate use. The heat setting process, the object of which is to confer dimensional stability, is effected by heating the fibres to a high temperature, normally about 200° C. The heat setting process takes place in air and normally results in some discolouration of the fibre due to oxidative attack. This discolouration can, however, be removed by a subsequent bleaching operation, especially by bleaching in aqueous sodium chlorite. However, this bleaching operation, when carried out on delustred fibre which contains a manganese compound to improve light stability, results in a different discolouration, usually of a brownish nature, which is presumed to be due to oxidation of the manganese compound.

We have now found that if a delustered synthetic linear fibre-forming polyamide composition contains an antimony compound in addition to a manganese compound not only is the accelerated loss in strength on exposure to light due to the presence of the delustering agent reduced or eliminated, but the discolouration on bleaching due to the presence of the manganese compound is also reduced or eliminated.

Thus the invention provides a delustered polyamide composition comprising a synthetic linear fibre-forming polyamide and a delustering agent, the said composition containing chemically combined manganese and chemically combined antimony.

The combined manganese, or at least a part of it, should preferably be in the manganous state.

The delustering agent used in our polyamide composition is normally titanium dioxide which may be either in the anatase or the rutile form, and may be prepared either by the "sulphate" process or the "chloride" process. The amount of delustering agent present in the composition may vary between 0.01% and 20% by weight. Since, however, the deleterious effect of the delustering agent on light stability is not very serious when the proportion of delustering agent is small, our polyamide compositions normally contain between 0.1% and 5% by weight of delustering agent.

The proportion of manganese present in our polyamide compositions normally varies between 5 and 100 parts per million by weight calculated as manganese, and the proportion of antimony between 10 and 500 parts per million by weight calculated as antimony. Preferred ranges are between 10 and 75 parts per million by weight of manganese, and between 20 and 300 parts per million by weight of antimony. Preferred ratios of antimony to manganese lie between 1:1 and 5:1 by weight.

The polyamide composition of our invention may be made in various ways. According to one method the delustering agent and a manganese compound and an antimony compound are added to the polyamide-forming ingredients before or during the polycondensation reaction which gives rise to the polyamide, and the polycondensation reaction then completed.

Suitable polyamide-forming ingredients are well known to the art, as are the methods of converting them to synthetic linear fibre-forming polyamides. A suitable polyamide-forming mixture is, for example, an aqueous solution of the salt of a diamine with a dicarboxylic acid, for example hexamethylene diamine adipate giving rise to nylon 66. Alternatively, the polyamide-forming ingredient might be, for example, ε-amino-caproic acid or caprolactam giving rise to nylon 6. The polyamide-forming ingredients are heated until the desired degree of polycondensation is achieved. In the case of amino-carboxylic acids, or of mixtures of, or salts of, diamines with dicarboxylic acids, water is formed in the polycondensation reaction and provision must be made for its removal. It may be convenient to start with the ingredients in the form of an aqueous solution. It may be advantageous to carry out the polycondensation in an atmosphere of a non-oxidising gas, for example nitrogen, and in an autoclave under pressure with provision for removing water from the reaction mixture by bleeding off as steam. The temperature of the reaction mixture is usually raised gradually to that required to effect the desired degree of polycondensation, which temperature may be within the range 250° C. to 300° C.

Suitable manganese compounds include manganese salts and especially manganous salts of carboxylic acids and in particular of aliphatic carboxylic acids, for example manganous acetate, manganous lactate and manganous oxalate. Other suitable manganese salts are manganous chloride, manganous sulphate and especially manganese salts of oxy acids of phosphorus, for example manganous hypophosphite, manganous phosphate, manganous pyrophosphate and complex phosphates of manganese such as manganese hexametaphosphate. Suitable antimony compounds include antimony oxides (antimony trioxide, tetroxide or pentoxide), antimonyl compounds (e.g. potassium antimonyl tartrate), antimonous acid or its salts or esters, antimonic acid or its salts, and antimony halides and sulphides. If desired, the combined manganese and combined antimony may be present in the same compound, for example manganous meta-antimonate. The delustering agent, normally titanium dioxide, may be added as an aqueous slurry. The manganese and antimony compounds may be added in solid form, or as solutions or suspensions in liquids, especially water. All the additions may be made together or separate additions may be made at different stages of the polycondensation reaction.

Another method by which the polyamide compositions of our invention may be made is by incorporating the manganese and antimony with the delustering agent before adding it to the polyamide-forming ingredients before or during the polycondensation. In this method at least a part of the manganese should be in the manganous state. It is already known to make titanium dioxide pigments containing small proportions of antimony oxide. Thus such pigments may be made by calcining a mixture containing titanium dioxide or a hydrated titanium compound and an antimony compound, for example antimony trioxide, antimony pentoxide or tartar emetic. The manufacture of such pigments is described for example in specifications Nos. 473,312, 479,072 and 529,596.

It is also known that titanium dioxide pigments may be coated with various substances. The object of such coatings is normally to counteract the tendency of titanium dioxide to accelerate the photochemical oxidation of the substrate to which the pigment is applied. Thus it has been proposed to coat titanium dioxide pigments by precipitating on them such compounds as aluminium silicate or aluminium phosphate. Processes for effecting such coatings are described, for example, in specification No. 969,352 and in United States specification No. 2,668,776. It has also been proposed to precipitate manganese hydroxide on to titanium dioxide, for example by adding a water-soluble manganese salt to an aqueous suspension of titanium dioxide and then adding an alkali. It has further been proposed to pretreat a titanium dioxide pigment by working it in aqueous suspension with a water-insoluble manganese salt, for example manganese stearate, and a pigment dispersing agent. Such processes are described, for example, in specification No. 998,225 and German specification No. 737,943.

This other method for making the polyamide compositions of our invention consists, therefore, in one of its aspects, in adding to the polyamide-forming ingredients before or during the polycondensation, a titanium dioxide pigment containing an antimony compound for example the oxide, which pigment has been coated with a manganous compound, for example manganous phosphate, manganous hydroxide, manganous stearate, or manganous silicate, and then completing the polycondensation.

The amount of antimony in the titanium dioxide pigment containing antimony may vary, for example, between 0.02% and 5% by weight and is preferably between 0.1% and 0.5% calculated as $Sb_2O_3$. The amount of manganese applied to the pigment as a coating may vary, for example, between 0.05% and 2.0% and preferably between 0.15% and 0.5% by weight calculated as MnO. It is also possible, of course, to apply other coatings to the pigment, for example an aluminium silicate or an aluminium phosphate, or hydrous oxides of titanium, aluminium, silicon, cerium or zirconium.

It may be advantageous to add the manganese as a coating on the delustering agent rather than separately as, for example, a manganese salt, since the presence of salts can adversely affect the viscosity of the polyamides when they are melted for spinning into fibres.

The discolouration on bleaching normally experienced with yarns from polyamides containing manganese compounds is reduced or eliminated when an antimony compound is also present as in our invention. We prefer that the manganese compound shall be associated with the antimony compound as far as possible, that is to say we prefer either that both a manganese compound and an antimony compound shall be added to the polyamide-forming ingredients before or during polycondensation, or that both a manganese compound and an antimony compound shall be incorporated with the delustering agent, or that both manganese and antimony shall be associated in a single chemical compound, for example manganous metaantimonate.

Our polyamide compositions may contain other ingredients. Thus they may contain ingredients added for the purpose of improving the stability of the polyamide towards heat or towards atmospheric oxygen, for example copper compounds especially in conjunction with halide compounds, and organic antioxidants.

Thus among particularly valuable polyamide compositions of our invention are those which contain a synthetic linear fibre-foaming polyamide, a delustering agent, chemically combined manganese and chemically combined antimony, and in addition a copper compound and a halide compound. Although any copper compound may be used it is preferred to use a copper salt and especially a salt of a weak acid or an enol, for example copper acetate or copper acetylacetonate. The halide may be a chloride, bromide or iodide, but we particularly prefer to use an iodide. The halide compound may be an inorganic halide such as a halide of an alkali metal or alkaline earth metal, for example potassium iodide. Alternatively the halide may be the hydrohalide of an organic base or the halide of a quaternary ammonium base. Particularly suitable are the hydroiodides of difficultly volatile strong organic bases, for example piperazine, piperidine, morpholine, ethylene diamine or hexamethylene diamine. The copper compound is usually present in the polyamide composition in an amount, calculated as copper, between 3 and 30 parts per million by weight and the halide compound in an amount, calculated as halogen, between 200 and 2000 parts per million by weight. These particular polyamide compositions of our invention are not only stabilised against loss in strength on exposure to light, and not only have resistance to discolouration on bleaching, but also have resistance to degradation and discolouration due to the action of heat in the presence of oxygen, such as the oxygen of the air, for example during the heat setting process to which yarns spun from the polyamide compositions are frequently subjected. These particular polyamide compositions may be made for example, by adding titanium dioxide containing a small proportion of an antimony compound (for example the oxide) and coated with a manganous compound, together with a copper compound and a halide compound, to the polyamide-forming components before or during the polycondensation, and then completing the polycondensation.

Other particularly valuable polyamide compositions of our invention are those which contain a synthetic linear fibre-forming polyamide, a delustering agent, chemically combined manganese and chemically combined antimony, together with one or more of certain phenols and hypophosphorous acid or a salt thereof. The phenols are those which are stable in the polyamide when molten and particularly suitable are the so-called sterically hindered phenols. A particularly suitable class of sterically hindered phenols comprises those compounds which carry in the para or preferably the ortho position to the phenolic hydroxyl group a group, preferably a hydrocarbon group, which is attached to the phenol nucleus through a carbon atom of the said group which is a saturated carbon atom and is attached to at least two and preferably to three carbon atoms in addition to the carbon atom of the phenol nucleus. Examples of such groups are sec. alkyl and especially tert.-alkyl groups, for example tert.-butyl groups, and cycloalkyl groups, especially cycloalkyl groups carrying an alkyl group on the carbon atom through which they are attached to the phenol nucleus, for example a 1-methyl-1-cyclohexyl group. Specific examples of suitable phenols are 2-α-methylcyclohexyl-4,6-dimethylphenol,
bis-(2-hydroxy-3-α-methylcyclohexyl-5-methyl-phenyl)-methane,
1,1,3-tris-(2'-methyl-4'-hydroxy-5'-tert.-butyl-phenyl)butane,
1,1,5,5-tetrakis-(2'-methyl-4'-hydroxy-5'-tert.-butyl-phenyl)pentane,
2,6-tert.-butyl-4-methylphenol,
1,2-bis(2'-hydroxy-3'-tert.-butyl-5'-methylphenyl)ethane, and
1,1,5,5-tetrakis(2'-hydroxy-3'-tert.-butyl-5'-methyl-phenyl)-pentane.

1,1,3 - tris - (2' - methyl - 4' - hydroxy - 5' - tert.-butyl-phenyl)butane is particularly suitable. The hypophosphorous acid may be used as such or in the form of a salt. The salt may be an inorganic salt, for example the salt of an alkali metal or an alkaline earth metal, or may be the salt with an organic base, especially an organic nitrogen-containing base, for example hexamethylene diamine. The phenol is usually present in the polyamide composition in an amount between 0.025% and 5% by weight, and the hypophosphorous acid or a salt thereof in an amount, calculated as phosphorus, between 25 and 1000 parts per million weight. Preferably the hypophosphorous acid or the salt thereof is present in an amount of from 35 to 300 parts per million by weight, calculated as phosphorus and based on the weight of the polyamide. We also prefer that the amount of hypophosphorous acid or salt should be restricted to the lower part of the preferred range where the titanium dioxide used is in the lower part of its normal range (0.1% to 5%). These particular polyamide compositions of our invention are not only stabilised against loss in strength on exposure to light, and not only have resistance to discolouration on bleaching, but also have marked resistance to degradation and discolouration due to the action of heat in the presence of oxygen, such as the oxygen of the air, for example during the heat setting process to which yarns spun from the polyamide compositions are frequently subjected. These particular polyamide compositions may be made, for example, by adding titanium dioxide containing a small proportion of an antimony compound (for example the oxide) and coated with a manganous compound, together with a phenol as defined and hypophosphorous acid or a salt thereof, to the polyamide-forming components before or during the polycondensation, and then completing the polycondensation.

The invention is illustrated but not limited by the following examples in which the parts and percentages are by weight.

EXAMPLE 1

A mixture of 262 parts of hexamethylene diamine adipate, 175 parts of water, 0.3 part of acetic acid, 0.055 part of manganous acetate tetrahydrate and 0.0325 part of antimony trioxide was heated in an autoclave in the absence of air. When the pressure had risen to 250 p.s.i.g. it was maintained at this level by slowly releasing steam. About ten minutes after the start of steam release 4.52 parts of titanium dioxide dispersed in water was added to the autoclave, via a pressure lock. When the temperature of the batch reached 245° C. the pressure was gradually reduced to atmospheric pressure over 90 minutes while heating was continued so that the temperature rose to 270° C. The polymer was held for a further 30 minutes at 275° C. and atmospheric pressure, and then was extruded from the autoclave under nitrogen pressure, quenched in cold water and cut into small flakes.

The resultant white polymer was not discoloured after treatment with sodium chlorite solution, whereas a control polymer made with the omission of antimony trioxide was stained brown.

EXAMPLE 2

A polyamide was prepared as described in Example 1 but replacing the antimony trioxide by 0.072 part of antimony pentoxide. The polymer was not discoloured by sodium chlorite solution.

EXAMPLE 3

A 50% aqueous solution of hexamethylene diammonium adipate containing copper acetate (equivalent to 5 parts per million of copper in the finished polymer) and hexamethylene diammonium iodide (equivalent to 300 parts per million of iodine in the finished polymer) is concentrated by evaporation. The concentrated solution, containing 85% of hexamethylene diammonium adipate, is charged to an autoclave and the autoclave sealed. The autoclave is heated until the pressure reaches 250 p.s.i.g. when controlled release of steam is commenced to maintain the pressure at that level, heating being continued. When the temperature of the contents of the autoclave reaches 240° C. an aqueous slurry of a pigmentary anatase $TiO_2$ (which had been wet coated with hydrous oxides of silica, alumina and 0.28% manganous phosphate, the coatings being applied to a calciner discharge containing 0.2% antimony (expressed as $Sb_2O_3$)) is added through a pressure lock in amount sufficient to give 2.0% of the pigment in the finished polymer. Heating is continued until the temperature reaches 250° C. when the pressure is gradually released until it reaches atmospheric pressure. Heating is continued to complete polycondensation until the temperature reaches 268° C. when heating is discontinued. The molten polyhexamethylene adipamide is then discharged from the autoclave, cooled until it solidifies and then broken up.

The polyamide prepared as described was melt spun into filaments and the filaments drawn into yarn. For a description of the properties of this yarn see Examples 6 and 7.

EXAMPLE 4

An 85% aqueous solution of hexamethylene diammonium adipate is charged to an autoclave and the autoclave sealed. The autoclave is heated until the pressure reaches 100 p.s.i.g. when hexamethylene diammonium hypophosphite (equivalent to 290 parts per million of phosphorus in the finished polymer) is added. Heating is continued until the pressure reaches 250 p.s.i.g. when 0.05% calculated on the weight of the finished polymer, of 1,1,3-tris-(2'-methyl-4-hydroxy-5'-tert.-butyl-phenyl)-butane is added. Controlled release of steam is commenced to maintain the pressure at 250 p.s.i.g., heating being continued. When the temperature of the contents of the autoclave reaches 240° C. an aqueous slurry of the coated titanium dioxide containing antimony oxide used in Example 3 is added through a pressure lock in an amount sufficient to give 2.0% of the pigment in the finished polymer. The remainder of the polycondensation to give polyhexamethylene adipamide is effected as in Example 3.

The polyamide prepared as described was melt spun into filaments and the filaments drawn into yarn. The yarn, after heat setting and bleaching with sodium chlorite, was white.

EXAMPLE 5

A polyamide was made as described in Example 1 excepting that additionally 0.00355 part of copper acetate and 0.099 part hexamethylene diammonium iodide were added to the hexamethylenediamine adipate before polymerization. The polyamide was melt spun into filaments and the filaments drawn into yarn. A similar yarn was spun from a polyamide made as in Example 1 except that no addition of antimony trioxide was made. The two yarns were heat set at 220° C. for 30 seconds and then bleached with sodium chlorite solution. The yarn containing antimony trioxide, manganous acetate, copper acetate and hexamethylene diammonium iodide remained white, while the control yarn, containing only manganous acetate, was discoloured yellow. The two yarns after heat setting and bleaching were exposed to light from a xenon arc for 24 hours and the tenacity determined before and after exposure. The yarn containing antimony trioxide, manganous acetate, copper acetate and hexamethylene diammonium iodide lost 10.2% of its initial tenacity while the control yarn lost 30.2% of its initial tenacity.

EXAMPLE 6

(a) A polyamide was made as described in Example 3, excepting that the titanium dioxide pigment used contained 3.0% of antimony trioxide instead of 0.2%. The polyamide was melt spun into filaments and the filaments drawn into yarn.

(b) For comparison a polyamide was made as described in Example 3, excepting that the titanium dioxide used contained 0.3% MnO instead of 0.17% and contained no antimony trioxide. The polyamide was melt spun into filaments and the filaments drawn into yarn.

The two yarns prepared as above, together with the yarn from Example 3 were heat set and bleached with sodium chlorite. the b-chromaticity of the bleached yarns was determined using a Colormaster Mark 5 colorimeter. The bleached yarns were exposed to light from a xenon arc for 48 hours and the tenacity of the yarns measured before and after exposure. The b-chromaticity of the bleached yarn and the percentage loss of tenacity after exposure to the xenon arc are given in the following table.

| Example | Percent Sb$_2$O$_3$ in pigment | Percent MnO in pigment | b-Chromaticity after heat setting and bleaching | Percent loss in tenacity of heat set and bleached yarn on light exposure |
|---|---|---|---|---|
| 6b | Nil | 0.3 | 0.292 | 20.8 |
| 3 | 0.2 | 0.17 | 0.307 | 15.8 |
| 6a | 3.0 | 0.17 | 0.323 | 11.6 |

(All yarns contain 5 p.p.m. of copper and 300 p.p.m. of iodine as in Example 3.)

In this example the b-chromaticity is the ratio of the percent reflected blue light to the sum of the percent reflected blue, green and red light and is similar to the z trichromatic coefficient of the International Commission on Illumination System (Handbook of Colorimetry, A.C. Hardy, The Technology Press, Cambridge, Mass., U.S.A.). It is a measure of the whiteness of the yarn.

The table shows the improved colour of the yarn and the reduced loss in strength on exposure to light resulting from the presence of the antimony.

EXAMPLE 7

(a) A polyamide was made as described in Example 4 except that the hexamethylene diammonium hypophosphite was added to the aqueous solution of hexamethylene diammonium adipate and the 1,1,3-tris-(2'-methyl-4-hydroxy-5'-tert.-butylphenyl)-butane was added when the autoclave pressure reached 100 p.s.i.g.

The polyamide was melt spun into filaments and the filaments drawn into a yarn.

(b) For comparison a polyamide was made as described in Example 3 except that the pigmentary anatase titanium dioxide used had been wet coated with hydrous titania and alumina and contained no manganese or added phosphorus and substantially no antimony and the polyaimde contained 56 p.p.m. of manganese which was added as a solution of manganous acetate to the aqueous solution of hexamethylene diammonium adipate before polycondensation.

The polyamide was melt spun into filaments and the filaments drawn into a yarn.

(c) Also for comparison a polyamide was made as described under (b) above, except that no addition of copper acetate or hexamethylene diammonium iodide were made.

The polyamide was melt spun into filaments and the filaments drawn into a yarn.

The three yarns prepared as above, together with the yarn from Example 3, were heat set. The amine end group concentration in the yarns was determined before and after heat setting by solution in phenol and methanol and titration with N/20 hydrochloric acid using a mixture of Methyl Orange and Xylene Cyanol as indicator. The heat set yarn was bleased with sodium chlorite. The b-chromaticity of the bleached yarn was determined using a Colormaster Mark 5 colorimeter. The bleached yarns were exposed to light from a xenon arc for 48 hours and the tenacity of the yarns determined before and after exposure. The percentage loss of amine end groups, the b-chromaticity of the bleached yarns and the percentage loss of tenacity on exposure to light from a xenon arc, are given in the table below:

TABLE

| Example | Percent MnO in pigment | P.p.m. Mn in polyamide | Percent Sb$_2$O$_3$ in pigment | Percent P$_2$O in pigment | Antioxidant | Percent loss of amine end groups on heat setting | b-Chromaticity after heat setting and bleaching | Percent loss in tenacity after irradiation of heat set and bleached yarn |
|---|---|---|---|---|---|---|---|---|
| 3 | 0.17 | 26 | 0.2 | 0.8 | 5 p.p.m. copper, 300 p.p.m. iodine | 12.6 | .307 | 15.8 |
| 7b | Nil | 56 | Nil | Nil | do | 13.5 | .274 | 34.3 |
| 7c | Nil | 56 | Nil | Nil | Nil | 31.4 | .278 | 34.7 |
| 7a | 0.17 | 26 | 0.2 | 0.8 | 0.05% 1,1,3-tris-(2'-methyl-4-hydroxy-5'-tert.-butylphenyl)-butane, 290 p.p.m. phosphorus as hexamethylene diamine hypophosphite. | 11.6 | .330 | 10.8 |

The table shows the improved colour of the yarn and the reduced loss in strength on exposure to light resulting from the presence of the antimony.

EXAMPLE 8

A 50% aqueous solution of hexamethylene diammonium adipate containing manganese acetate (equivalent to 56 parts per million of manganese in the finished polymer), copper acetate (equivalent to 5 parts per million of copper in the finished polymer) and hexamethylene diammonium iodide (equivalent to 300 parts per million of iodine in the finished polymer) was concentrated by evaporation. The concentrated solution, containing 85% of hexamethylene diammonium adipate, was charged to an autoclave and the autoclave sealed. The autoclave was heated until the pressure reached 250 p.s.i.g. when controlled release of steam was commenced to maintain the pressure at that level, heating being continued. When the temperature of the contents of the autoclave reached 220° C. an aqueous slurry of a titanium dioxide containing 0.2% antimony oxide was added through a pressure lock in amount sufficient to give 2.0% of the pigment in the finished polymer. Heating was continued until the temperature reached 250° C. when the pressure was gradually released until it reached atmospheric pressure. Heating was continued to complete polycondensation until the temperature reached 268° C. when heating was discontinued. The molten polyhexamethylene adipamide was then discharged from the autoclave, cooled until it solidified and then broken up.

The polyamide prepared as described was melt spun into filaments and the filaments drawn into yarn. The yarn was noticeably whiter than the yarn from Example 7b which contained no antimony.

We claim:

1. Delustered polyamide fibers of a composition comprising a synthetic linear fiber-forming polyamide, from 0.1 to 5% by weight of titanium dioxide as delustering agent, a manganese compound in the proportion of from 5 to 100 parts per million by weight calculated as manganese at least a part of the manganese being in the manganous state and an antimony compound in the proportion of from 10 to 500 parts per million by weight calculated as antimony.

2. A delustered polyamide composition comprising a synthetic linear fiber-forming polyamide, from 0.1% to 5% by weight of titanium dioxide as delustering agent, a manganese compound in the proportion of from 10 to 75 parts per million by weight calculated as manganese at least a part of the manganese being in the manganous state, and an antimony compound in the proportion of from 20 to 300 parts per million by weight calculated as antimony.

3. A composition as claimed in claim 2 containing in addition a copper salt in the proportion of from 3 to 30 parts per million by weight calculated as copper and an iodide in the proportion of from 200 to 2000 parts per million by weight calculated as iodine.

4. A composition as claimed in claim 2 containing in addition a sterically hindered phenol in the proportion of from 0.025% to 5% by weight and hypophosphorous acid or a salt thereof in the proportion of from 35 to 300 parts per million by weight calculated as phosphorus.

5. A process for the manufacture of light-stabilized delustered synthetic linear polyamide fibers which comprises adding to polyamide-forming ingredients, before or during the polycondensation reaction which gives rise to the polyamide, from 0.1% to 5% by weight calculated on the weight of the polyamide of titanium dioxide, 5 to 100 parts calculated as manganese, per million parts by weight of the polyamide of a manganese compound, at least a part of the manganese being in the manganous state, and from 10 to 500 parts, calculated as antimony, per million parts of the polyamide of an antimony compound, effecting the polycondensation reaction by heating, and melt spinning the resulting polymer into fibers.

6. A process as claimed in claim 5 for the manufacture of light-stabilized, delustered synthetic linear polyamide fibers which comprises adding to polyamide-forming ingredients, before or during the polycondensation reaction which gives rise to the polyamide, from 0.1 to 5% by weight calculated on the weight of the polyamide of a titanium dioxide pigment which contains from 0.1% to 0.5% calculated as $Sb_2O_3$ of an antimony compound and is coated with a manganous compound selected from the group consisting of manganous phosphate, manganous hydroxide, manganous stearate and manganous silicate, the amount of manganese applied to the titanium dioxide as a coating being between 0.15% and 0.5% calculated as MnO, effecting the polycondensation reaction by heating and melt spinning the resulting polymer into fibers.

7. A process as claimed in claim 6 in which the coating also contains a copper compound in a proportion of 3 to 30 parts per million parts of polyamide calculated as copper and a halide compound in a proportion of 200 to 2000 parts per million parts of polyamide calculated as halogen.

8. A process as claimed in claim 6 in which the coating also contains a phenol which is stable in the polyamide when molten in the proportion of from 0.025% to 5% by weight of the polyamide, and hypophosphorous acid or a salt thereof in the proportion of 35 to 300 parts per million calculated as phosphorus.

9. A process as claimed in claim 6 for the manufacture of light-stabilized and heat-stabilized synthetic linear polyhexamethylene adipamide fibers which comprises adding to an aqueous solution of hexamethylene diamine adipate, before or during the polycondensation reaction which gives rise to the polyamide, from 0.1% to 0.5% by weight calculated on the weight of the polyamide of a titanium dioxide pigment which contains from 0.1% to 0.5% calculated as $Sb_2O_3$ of an antimony oxide and is coated with a manganous phosphate, the amount of manganese applied to the titanium dioxide as a coating being between 0.15% and 0.5% by weight calculated as MnO, from 0.025% to 5% by weight of 1,1,3-tris-2'-methyl-4'-hydroxy-5'-tert.-butylphenyl) butane, and from 35 to 300 parts per million by weight calculated as phosphorus of hypophosphorous acid or a salt thereof with an alkali metal or an organic nitrogen-containing base, heating the polycondensation mixture under pressure in an atmosphere of a non-oxidizing gas while removing water from the reaction mixture by bleeding off as steam so as to complete polycondensation, the temperature being raised gradually to a value within the range 250° C. to 300° C. and melt spinning the resulting polymer into fibers.

References Cited

UNITED STATES PATENTS

| | | | |
|---|---|---|---|
| 3,324,071 | 7/1967 | Skoog et al. | 260—37 N |
| 3,352,821 | 11/1967 | Costain et al. | 260—45.75 |
| 3,418,267 | 12/1968 | Busse | 260—37 N X |
| 2,705,227 | 3/1955 | Stamatoff | 260—45.7 |
| 3,242,134 | 3/1966 | Papero | 260—45.75 |

FOREIGN PATENTS

| | | | |
|---|---|---|---|
| 890,437 | 2/1962 | Great Britain | 260—45.95 |

LEWIS T. JACOBS, Primary Examiner

U.S. Cl. X.R.

260—45.75 R